Patented Nov. 4, 1947

2,430,288

UNITED STATES PATENT OFFICE 2,430,288

HYDROPHOBIC INSECTICIDAL POWDER

Albert L. Flenner, Wilmington, Del., assignor to E. I. du Pont de Nemours & Company, Wilmington, Del., a corporation of Delaware No Drawing. Application July 18, 1944,
Serial No. 545,546

12 Claims. (Cl. 167—30)

This invention relates to compositions and methods for their preparation, and is particularly directed to the preparation of hydrophobic powders containing 4,4'-dichlorodiphenyl-1,1,1-trichloroethane suitable for application to the surface of water for the control of mosquito larvae.

4,4'-dichlorodiphenyl-1,1,1-trichloroethane has of late become of interest as an insect poison and its manufacture and use for this purpose are disclosed in U. S. Patent 2,329,074, British Patent 547,871, and British Patent 547,874. These patents disclose compositions suitable for dusting or for spraying, but the compositions disclosed are readily wetted by water and are not well adapted for mosquito control.

This invention has for its objects to provide compositions particularly suited to the control of mosquito larvae; to provide compositions containing 4,4' - dichloro - diphenyl-1,1,1-trichloroethane which are not readily wetted by water but float on the surface thereof; to provide hydrophobic powders containing 4,4'-dichlorodiphenyl-1,1,1-trichloroethane which spread on the surface of water and form a continuous film; to avoid the disadvantages of the prior art and to obtain advantages as will appear hereinafter. Further objects will become apparent as the description proceeds.

These objects are accomplished in the present invention by a combination of 4,4'-dichlorodiphenyl-1,1,1-trichloroethane, tricalcium phosphate, and an aliphatic amine having at least 8 carbon atoms.

It has been suggested to incorporate long-chain aliphatic amines and their salts and the corresponding quaternary ammonium compounds in insecticidal powders either to increase their dispersibility in water or to increase their adherence to foliage. See, for example, French Patent 700,-462 and British Patent 373,581. It is clear that the powders which were obtained according to the above patents were not hydrophobic but, on the contrary, in water gave very homogeneous dispersions without lump formation. This is entirely in accord with the observations of the present invention which show that in large concentrations, say at 10%, which is the concentration specified in Examples 1 and 2 of the patents, even the free amine imparts wettability.

According to this invention the amine is incorporated into a dusting powder comprising 4,4'-dichlorodiphenyl-1,1,1 - trichloroethane adsorbed on tricalcium phosphate and in this combination two unusual and extraordinary effects are obtained. In the first place, the amine, rather than promoting dispersibility as in the above-noted French and British patents, gives a powder which is distinctly hydrophobic. In the second place, the particles of the powder appear homophilic, that is, have affinity one for another, so that they spread out evenly on the surface of the water and form a continuous cohesive film, yet the powder is dusty and free-flowing.

While the compositions of the invention may be prepared in a suitable manner, as by simply milling the ingredients together, it is preferable to incorporate the amine into the 4,4-dichlorodiphenyl-1,1,1-trichloroethane as a homogeneous mixture as by dissolving the two in a common solvent or by dissolving the amine in fused 4,4'-dichlorodiphenyl-1,1,1-trichloroethane and thereafter dispersing the homogeneous mixture of amine and 4,4'-dichlorodiphenyl-1,1,1-trichloroethane on an inert powder. In this manner there is obtained a powder of superior properties characterized by a dispersion of a homogeneous mixture of 4,4' - dichlorodiphenyl - 1,1,1-trichloroethane on the surface of an inert powder.

The invention may be more fully understood by reference to the following examples in which the parts are by weight unless otherwise specified:

*Example 1*

50 parts of crude 4,4'-dichlorodiphenyl-1,1,1-trichloroethane having a setting point of 87.7° C. and 2 parts of stearylamine were dissolved in sufficient actone that when mixed with 148 parts of precipitated tricalcium phosphate there was obtained a paste. This paste was thoroly mixed and then dried and sifted, whereupon there was obtained a very dry powder which when applied to the surface of water spread out over the surface and formed a continuous hydrophobic film.

*Example 2*

50 parts of crude 4,4'-dichlorodiphenyl-1,1,1-trichloroethane having a setting point of 87.7° C. and 2 parts of stearylamine were dissolved in acetone as in Example 1. The solution was stirred up into a paste by adding 74 parts of talc and 74 parts of precipitated tricalcium phosphate. The paste was thoroly mixed and then dried. After sifting there was obtained a powder also having a dry feel but not so dry as the powder of Example 1. The powder was hydrophobic and spread out over the surface of water forming a continuous film.

This example illustrates that up to 50% of the tricalcium phosphate may be substituted by other

Example 3

The process of Example 1 was repeated using 100 parts of 4,4'-dichlorodiphenyl-1,1,1-trichloroethane, 96 parts of tricalcium phosphate, and 4 parts of stearylamine. There was obtained a product having 50% 4,4'-dichlorodiphenyl-1,1,1-trichloroethane content having the same properties as the 25% product of Example 1.

This example illustrates an extraordinary feature of the invention in that dusty, free-flowing powders containing high concentrations of 4,4'-dichlorodiphenyl-1,1,1-trichloroethane may be prepared which nonetheless exhibit the same hydrophobic properties and the same tendency to spread out over the surface of water and to form a continuous film. Such highly concentrated products are especially desirable in mosquito control work for dusting from airplanes and make it possible to obtain uniform and continuous coverage with a minimum load for the airplane.

Compositions prepared in a like manner and containing 50% 4,4'-dichlorodiphenyl-1,1,1-trichloroethane, 1 and 5% of stearylamine, and the balance tricalcium phosphate gave like results. Similarly good results were obtained with a stearylamine concentration of 7.5%, though the film obtained on water was not so tenacious but when the concentration of stearylamine was increased to 10% the powder obtained was distinctly inferior in that it wetted out easily and did not form a film.

Example 4

The process of Example 1 was repeated using 100 parts of 4,4'-dichlorodiphenyl-1,1,1-trichloroethane having a setting point of 87.7° C., 49 parts of tricalcium phosphate, 49 parts of talc, and 2 parts of stearylamine, and there was obtained a powder having essentially the same properties as the product of Example 2.

As illustrative of the unique character of the combination embodying 4,4'-dichlorodiphenyl-1,1,1-trichloroethane, tricalcium phosphate, and the amine there was obtained by substituting a diatomaceous earth for the tricalcium phosphate in Examples 2 and 4 a powder which while hydrophobic did not form a continuous film.

Example 5

441 parts of pure 4,4'-dichlorodiphenyl-1,1,1-trichlorethane (melting point 108° C.), 49 parts of precipitated tricalcium phosphate, and 10 parts of stearylamine are stirred up into a paste with acetone. After so mixing the paste was dried and then sifted to a fine powder. The properties and characteristics of the powder thus obtained were essentially identical with those obtained in Examples 1 and 3.

The critical character of the compositions of the invention are more fully brought out when stearic acid is substituted in the formulation of Example 1 and 3. The powders thus obtained, while hydrophobic, do not spread out over the water and form a continuous film like those of Examples 1 and 3.

The unique characteristic of the combination of 4,4'-dichlorodiphenyl-1,1,1-trichloroethane, tricalcium phosphate, and the amines is believed to be a result with blending of the particular electro-kinetic properties of the 4,4'-dichlorodiphenyl-1,1,1-trichloroethane and tricalcium phosphate with the cationic properties of the amine. Aliphatic amines having a long alkyl chain, for example, octylamine, decylamine, undecylamine, dodecylamine, tetradecylamine, pentadecylamine, hexadecylamine, octadecylamine, octadecenylamine, dicosylamine, tetracosylamine, ethyl decylamine, didodecylamine, methyl octadecylamine, dimethyl dodecylamine, dimethyl octadecylamine, as well as mixtures of amines obtained from hydrogenation of vegetable or animal oils or fats such as coconut oil, palm oil, sheep tallow or peanut oil, by the catalytic reduction of nitriles or amides of such fats or oils, are all characterized by fatty, water-insoluble, and cationic properties in that they tend to be adsorbed on surfaces having negative electro-kinetic potential and to render such surfaces hydrophobic. Materials so characterized may be substituted for the stearylamine in the methods and compositions of the invention. These include water-insoluble salts of the amines such as stearylamine sulfate and stearylamine oleate. But the water-soluble amine salts, while exhibiting some of the characteristics of the invention, do not give the perfect water repellency and film-forming properties of the insoluble compounds. While it is within the scope of the invention to use a wide variety of aliphatic amines having an alkyl group containing from 8 to 24 carbon atoms or more, the primary monoalkyl amines containing at least 12 and not more than 18 carbon atoms have properties most suitable to the purposes and objects of the invention.

The proportions of the ingredients may be varied widely within the spirit and scope of the invention. The content of amine may range from an effective amount up to about 7.5%. More than this is undesirable since at this concentration the desirable properties begin to be impaired and at higher concentrations, for example, 10%, are almost completely vitiated. The amount of 4,4'-dichlorodiphenyl-1,1,1-trichloroethane in the compositions may be varied without the criticalness of the amine and preferably should be as concentrated as possible, consistent with dry free-flowing powder. Preferably the 4,4'-dichlorodiphenyl-1,1,1-trichloroethane should constitute at least about 25% of the composition up to 50 or more percent, depending upon the purity of the 4,4'-dichlorodiphenyl-1,1,1-trichloroethane. The greater the purity of 4,4'-dichlorodiphenyl-1,1,1-trichloroethane the more concentrated can be the product without sacrificing dryness or dustability. The balance of the composition is made up of tricalcium phosphate or a mixture of tricalcium phosphate with another inert powder, such as talc, pyrophyllite, kieselguhr, chalk, lime, pumice stone, charcoal, walnut shell flour, wood flour, and gypsum. Up to 50% or more of the tricalcium phosphate may be replaced by other inert powder without detrimental loss in film-forming properties of the composition. While it is not generally desirable to have less than 50% of the adsorbent as tricalcium phosphate, yet any smaller quantity may be expected to give improved properties to the composition.

The invention is particularly suited to the preparation of hydrophobic powders of crude 4,4'-dichlorodiphenyl-1,1,1-trichloroethane, and even with such crude material is capable of producing dry dusty powders up to concentrations of around 50% crude 4,4'-dichlorodiphenyl-1,1,1-trichloroethane. 4,4'-dichlorodiphenyl-1,1,1-trichloroethane is obtained by effecting condensation of monochlorobenzene and a chloral-yielding compound in the presence of sulfuric acid. The product without purification e. g., by crystallizing from alcohol or petroleum ether as in the above patents, is a mixture of several isomers and unidentified side-reaction products. The mixture has no sharp melting point and has a tendency to undercool and to become sticky at relatively low temperatures. The quality of the crude is determined empirically by its setting point. The fused crude is cooled slowly and uniformly and a cooling curve is taken. Ordinarily, because the crude tends to supercool, the temperature gradually drops to a nadir then rises two or three degrees to a peak, and thereafter drops gradually. The temperature of the arrest, i. e., the peak, is the setting point. The setting point varies according to the method of preparation of the crude 4,4'-dichlorodiphenyl-1,1,1-trichloroethane and may range from 80 or lower up to above 90° C. It may vary a few degrees according to its method of determination. Ordinarily the crude material will not have a setting point above about 95° C. and will most commonly be within two or three degrees of 90° C.

With such crude material the problems of providing dry dusty powders containing high concentration of 4,4'-dichlorodiphenyl-1,1,1-trichloroethane are particularly pronounced even without the additional problem of making such powders hydrophobic. The compositions of the invention which contain from about 25 to about 50% crude 4,4'-dichlorodiphenyl-1,1,1 - trichloroethane having a setting point between about 87 and about 93° C., an aliphatic amine having an alkyl group containing at least 8 carbon atoms in an effective amount up to about 7.5%, and the balance an inert material at least about 50% of which is tricalcium phosphate, most effectively exhibit the novel and desirable characteristics of the compositions of this invention.

While the invention has been disclosed with reference to particular examples and to particular variations therefrom it will be understood that the invention is not limited by the illustrative embodiments thereof except as has been set out above.

I claim:

1. A composition of matter consisting in a dry free-flowing powder containing 4,4'-dichlorodiphenyl-1,1,1-trichloroethane, tricalcium phosphate, and an aliphatic amine having an alkyl group containing at least 8 carbon atoms and characterized by water-repellent and film-forming properties, the said amine being present in an effective amount up to about 7.5% of the composition.

2. A composition of matter consisting in a dry free-flowing powder containing 4,4'-dichlorodiphenyl-1,1,1-trichloroethane, tricalcium phosphate, and a monoalkyl amine containing from at least 12 to not more than 18 carbon atoms and characterized by water-repellent and film-forming properties, the said amine being present in an effective amount up to about 7.5% of the composition.

3. A composition of matter consisting in a powder composed essentially of about 25 to about 50% 4,4'-dichlorodiphenyl-1,1,1-trichloroethane having a setting point of between about 87 and about 93° C., an aliphatic amine having an alkyl group containing at least 8 carbon atoms in an effective amount up to about 7.5%, and the balance an inert powder at least about 50% of which is tricalcium phosphate.

4. A composition of matter consisting in a powder composed essentially of about 25 to about 50% 4,4'-dichlorodiphenyl-1,1,1-trichloroethane having a setting point of between about 87 and 93° C., a monoalkyl amine containing from at least 12 to not more than 18 carbon atoms in an effective amount up to about 7.5%, and the balance an inert powder at least about 50% of which is tricalcium phosphate.

5. The method which comprises dissolving an aliphatic amine having an alkyl group containing at least 8 carbon atoms in 4,4'-dichlorodiphenyl-1,1,1-trichloroethane, and adsorbing the mixture so obtained on an inert powder at least about 50% of which is tricalcium phosphate.

6. The method which comprises dissolving a monoalkyl amine containing from at least 12 to not more than 18 carbon atoms in 4,4'-dichlorophenyl-1,1,1-trichloroethane, and adsorbing the mixture so obtained on an inert powder at least about 50% of which is tricalcium phosphate.

7. A composition of matter consisting in a dry free-flowing powder composed of a homogeneous mixture of 4,4'-dichlorodiphenyl-1,1,1-trichloroethane with an aliphatic amine having an alkyl group containing at least 8 carbon atoms adsorbed on an inert powder at least about 50% of which is tricalcium phosphate and being characterized by water-repellent and film-forming properties, the said amine being present in an effective amount up to about 7.5% of the composition.

8. A composition of matter consisting in a dry free-flowing powder composed of a homogeneous mixture of 4,4'-dichlorodiphenyl-1,1,1-trichloroethane with a monoalkyl amine containing from at least 12 to not more than 18 carbon atoms adsorbed on an inert powder at least about 50% of which is tricalcium phosphate, and being characterized by water-repellent and film-forming properties, the said amine being present in an effective amount up to about 7.5% of the composition.

9. The composition according to claim 1 in which the amine is stearylamine.

10. The composition according to claim 3 in which the amine is stearylamine.

11. The method according to claim 5 in which the amine is stearylamine.

12. The composition according to claim 7 in which the amine is stearylamine.

ALBERT L. FLENNER.

REFERENCES CITED

The following references are of record in the file of this patent:

UNITED STATES PATENTS

| Number | Name | Date |
| --- | --- | --- |
| 2,033,866 | Schrauth | Mar. 10, 1936 |
| 2,161,462 | Flenner | June 6, 1939 |
| 2,349,814 | Deonier et al. | May 30, 1944 |
| 2,389,336 | Littler | Oct. 23, 1945 |

FOREIGN PATENTS

| Number | Country | Date |
| --- | --- | --- |
| 373,581 | Great Britain | 1932 |
| 547,874 | Great Britain | Sept. 15, 1942 |
| 700,462 | France | Dec. 23, 1930 |

OTHER REFERENCES

Jr. Ind. Eng. Chem., July 1946, page 4.